United States Patent [19]
Polkinghorne et al.

[11] Patent Number: 4,816,823
[45] Date of Patent: Mar. 28, 1989

[54] APPLICATION SPECIFIC INTEGRATED CIRCUIT

[75] Inventors: John Polkinghorne, Burlington; Michael Desnoyers, Ancaster, both of Canada

[73] Assignee: TRW Canada, Ltd., Ontario, Canada

[21] Appl. No.: 79,768

[22] Filed: Jul. 30, 1987

[30] Foreign Application Priority Data

Jul. 31, 1986 [CA] Canada ................................. 515108

[51] Int. Cl.⁴ .............................................. H04Q 9/00
[52] U.S. Cl. ........................... 340/825.15; 340/825.06; 370/85; 370/110.1
[58] Field of Search ...................... 340/825.15, 825.06; 370/65, 85, 110.1, 111, 24, 32

[56] References Cited

U.S. PATENT DOCUMENTS

| 4,614,944 | 9/1986 | Schwan | 340/825.06 |
| 4,641,307 | 2/1987 | Mussell | 370/85 |
| 4,746,918 | 5/1988 | Dijkers et al. | 340/825.06 |
| 4,750,165 | 6/1988 | Champagne et al. | 370/110.1 |

Primary Examiner—Gerald L. Brigance
Attorney, Agent, or Firm—Fay, Sharpe, Beall, Fagan, Minnich & McKee

[57] ABSTRACT

An application specific integrated circuit device for cooperating with a microprocessor and an input and read out station, providing timing functions, input data receipt and storage for transmition to the microprocessor, and for receiving, storing and acting upon information received from the microprocessor. The several functions which can be achieved by the circuit are carried out on command from the microprocessor using a single serial data path.

14 Claims, 20 Drawing Sheets

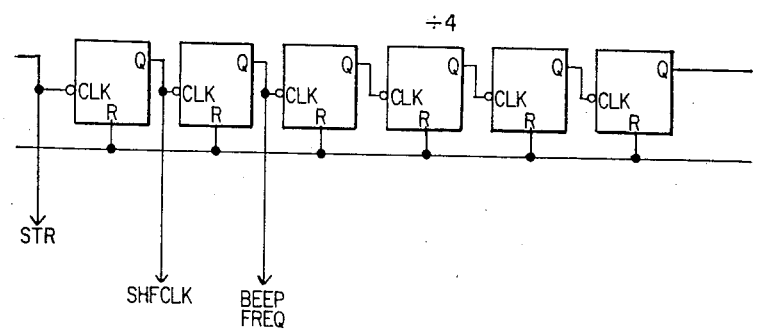
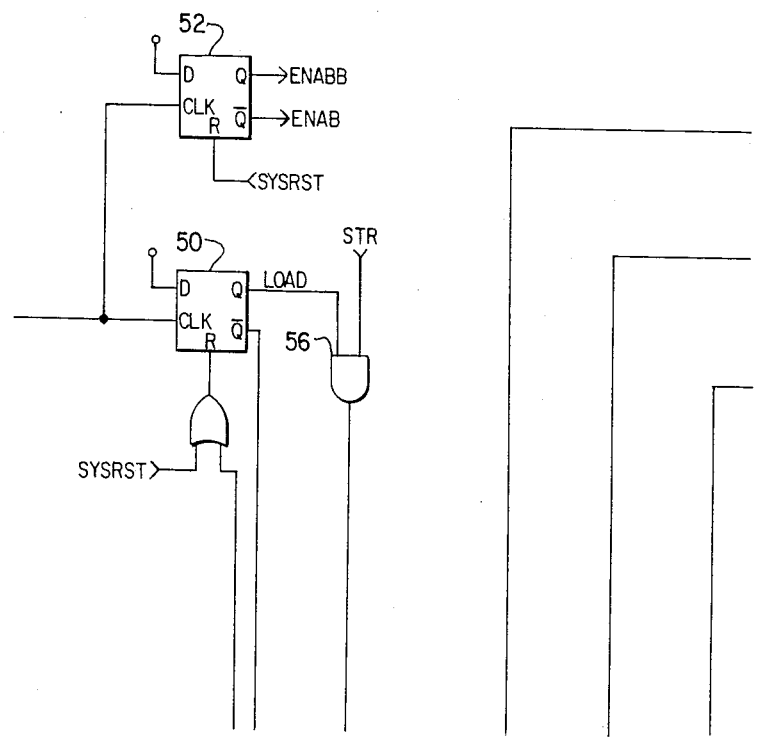
FIG.1c

FIG. 1e
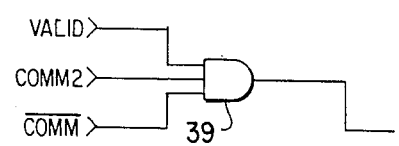
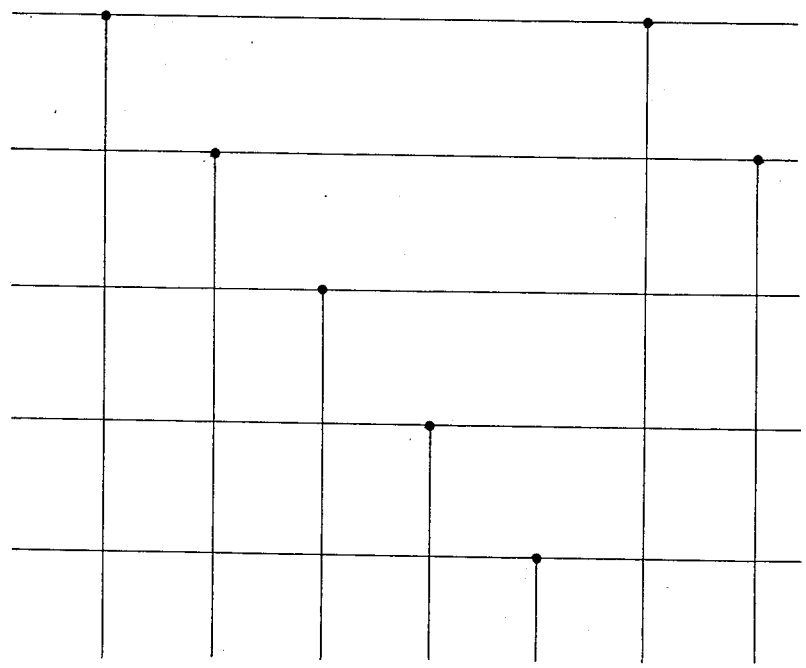

COL 4 (CH6)
COL 3
COL 2
COL 1

FIG. In

| FIG.Ia | FIG.Ib | FIG.Ic | FIG.Id | FIG.Ie | FIG.If | FIG.Ig |
|--------|--------|--------|--------|--------|--------|--------|
| FIG.Ih | FIG.Ii | FIG.Ij | FIG.Ik | FIG.IL | FIG.Im | FIG.In |

FIG. Io

APPLICATION SPECIFIC INTEGRATED CIRCUIT

This invention relates to Application Specific Integrated Circuit devices (ASIC's) with particular reference to such devices for providing control input to and monitoring function of electrical or electromechanical apparatus with special application to domestic appliances.

In appliances of this kind and with the development of programmable off-the-shelf microprocessors, it has become increasingly easier to arrange that all of the conventional operations carried out by such appliances be placed under the control of such microprocessors. The opportunity is presented to make many additional features of operation available when such processors are used. Until the present, however, each device has very largely had to be custom engineered, often at considerable expense and engineering time, so that the features which can actually be offered in reasonably priced apparatus have, necessarily, been limited. The custom building of electronic hardware for each separate apparatus is costly.

After much investigation of available standard devices and taking the approach that sensor input is required for many appliances, and that a keyboard input with liquid crystal display of functions to be or being carried out by the appliance are desirable, the present inventor has developed a universal circuit for an ASIC for acting in cooperation with a typical general microprocessor control, such as the Motorola MC6805P2, which is susceptible of various pin out arrangements dependent upon the specific functionality required in any particular case.

Criteria found to be desirable and in the ASIC herein described should provide at least the following capabilities:

26 Segment LCD Drive (Non-Multiplexed)
LCD Backplane Drive (60 Hz)
Piezo Acoustic Annunciator drive
LCD Backlight Control
Single line Asynchronous Communication Link
20 Key, Keyboard Matrix Input Further developments have shown that the device should also usefully include:

6 Channel A/D Converter
Approximate 60 Hz "Tick" Output
Watchdog Reset for the microprocessor
MODE pin to convert some bits of LCD sigment drivers for High Current Outputs It is an object of the present invention to provide a simple, universal integrated circuit, for cooperation with microprocessor equipment, which is capable of receiving serial information for display, of providing serial information from a keyboard or sensor input and which, at the same time, can provide the controlling timing functions both for itself and for synchronizing the microprocessor.

More particularly in accordance with one aspect of this disclosure, there is provided, a circuit for cooperation with serial data sending and receiving means (such as a microprocessor) which comprises, a terminal for data path connection therewith, a register for serially receiving data from, and for serially feeding data to the terminal, and a storage or latch means for data in the register. There is also a means for feeding local data into the register for its subsequent feeding to the terminal. A timing oscillation generates a shift clock signal to step the register synchronously with the serially received data from the terminal, and for serially stepping the register at a predetermined rate when serially feeding data stored in it to the terminal. A validating means detects presence of start and stop bit data in predetermined locations in the register thereby defining presence of a data phrase received at the terminal. Additional means detects command bit data in the phrase, and further means responsive to simultaneous output of the validating means, and the command bit data detector switches the data storage means and the register in accordance with the command bit data.

In another aspect of the disclosure the command bit data switch is the means for feeding local data into the register. Output means can also be provided for driving output devices from the storage or latch means.

In a further aspect of the disclosure a shift register can be conditioned to a plurality of states by a mode control means. Data can thus be received by the register either from a terminal to which the data has been fed or from a local data generating means. The register can also transmit data placed in it to the terminal. Means is responsive to data received by the shift register for actuating the mode control means.

Specific embodiments of the invention will now be described with reference to the accompanying drawings wherein:

FIG. 1 comprising FIGS. 1a to 1o inclusive shows a schematic circuit diagram of an embodiment of the novel ASIC device providing keyboard and sensor input, and drive for liquid crystal display and acoustic response beeper monitor;

As background to an understanding of this present disclosure, reference may be had to may copending Canadian patent application Ser. No. 448,959, filed Mar. 6, 1984 entitled Appliance Control System, which describes a microprocessor system for appliances, particularly refrigerators, and with which an ASIC of the type described in this present disclosure can find application.

Both preferred versions of the ASIC are constructed in CMOS technology and adhere to the general CMOS characteristics.

Figure 1A:
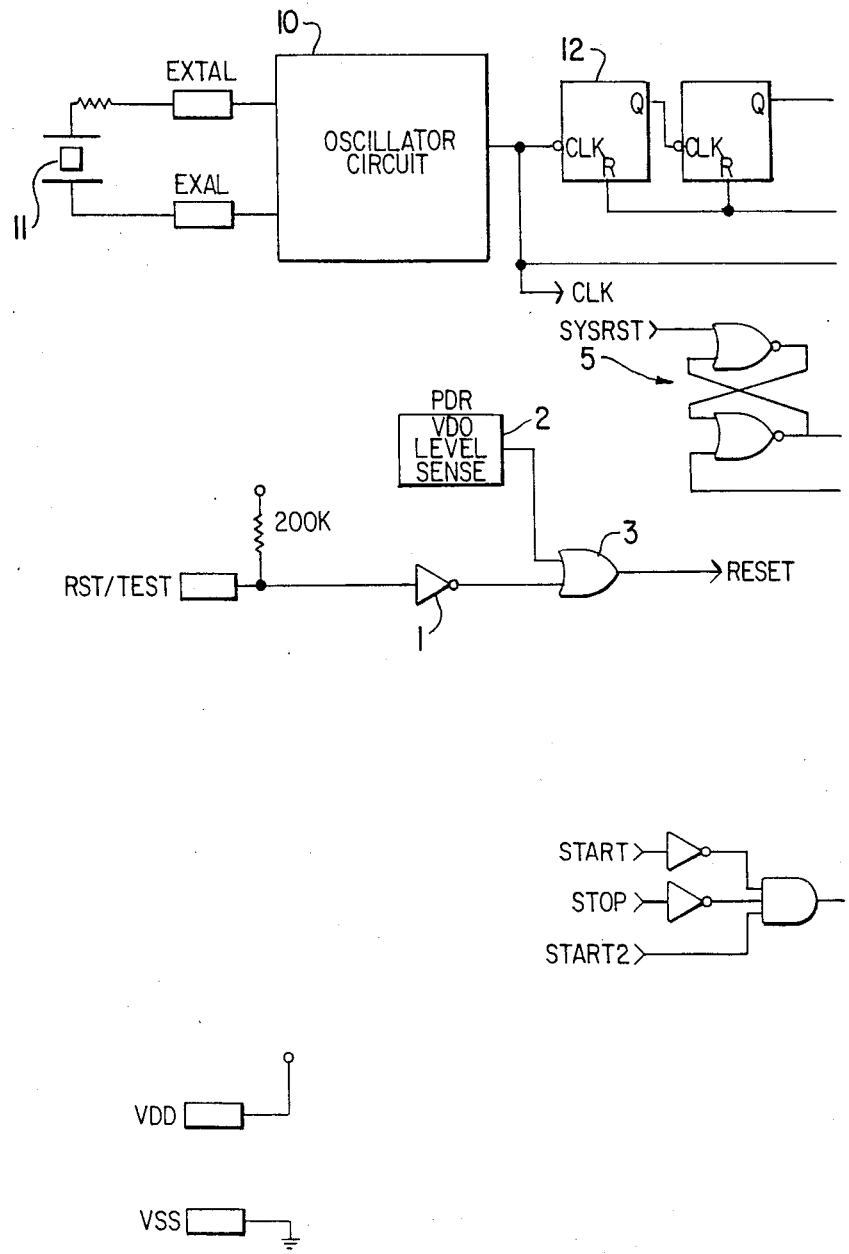
Figure 1B:
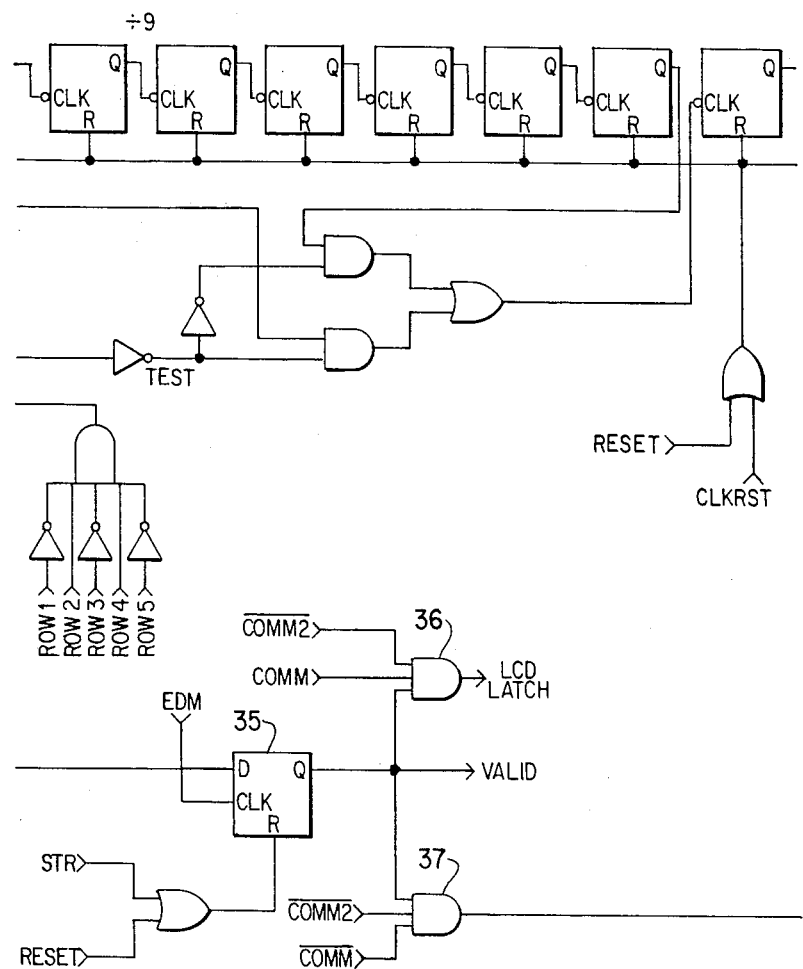
Figure 1D:
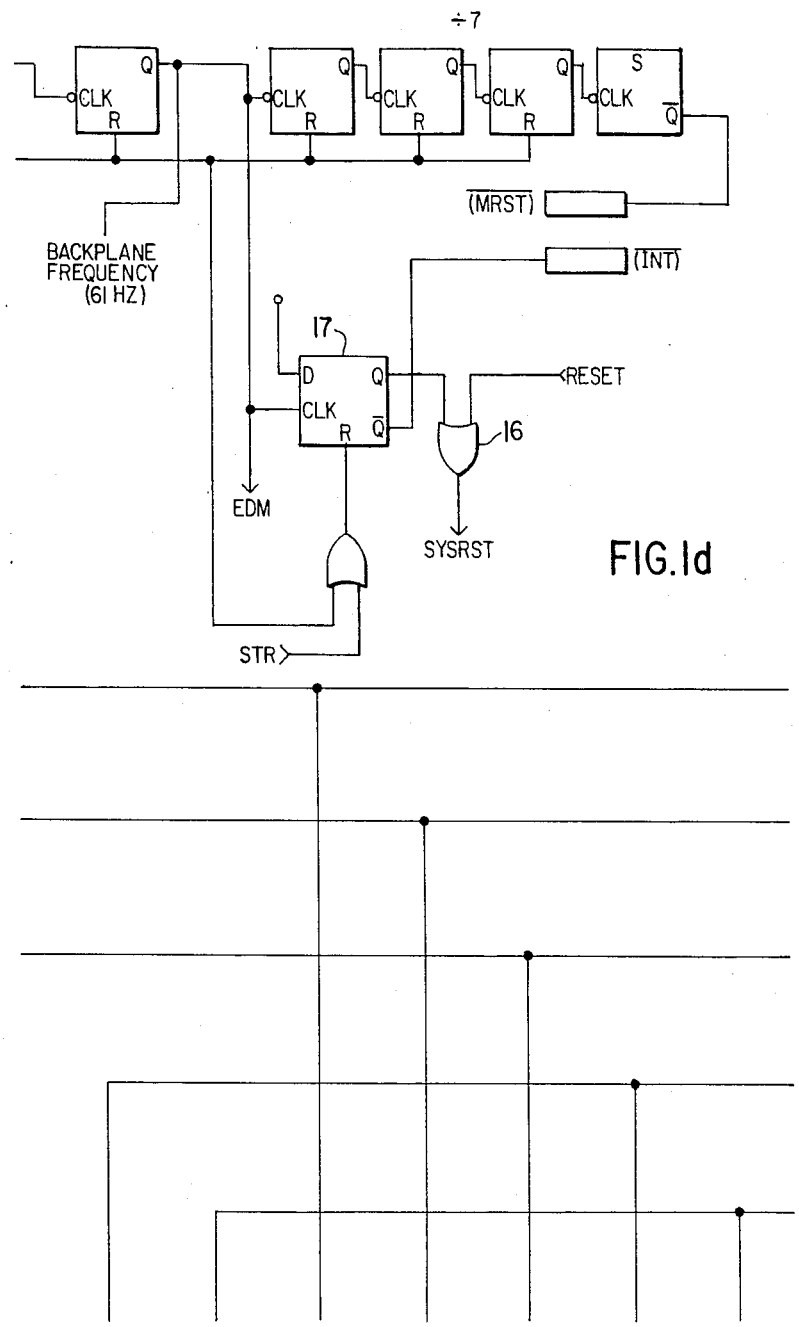
Figure 1F:
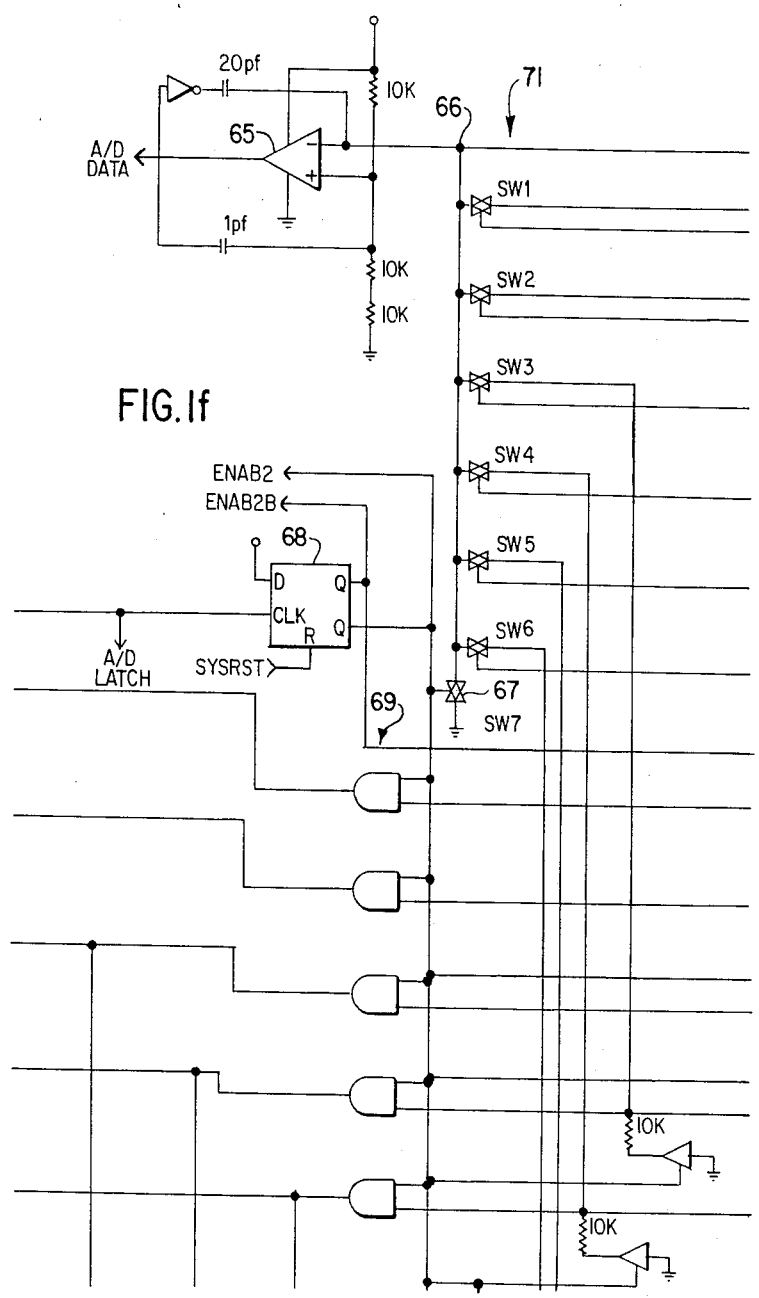
Figure 1G:
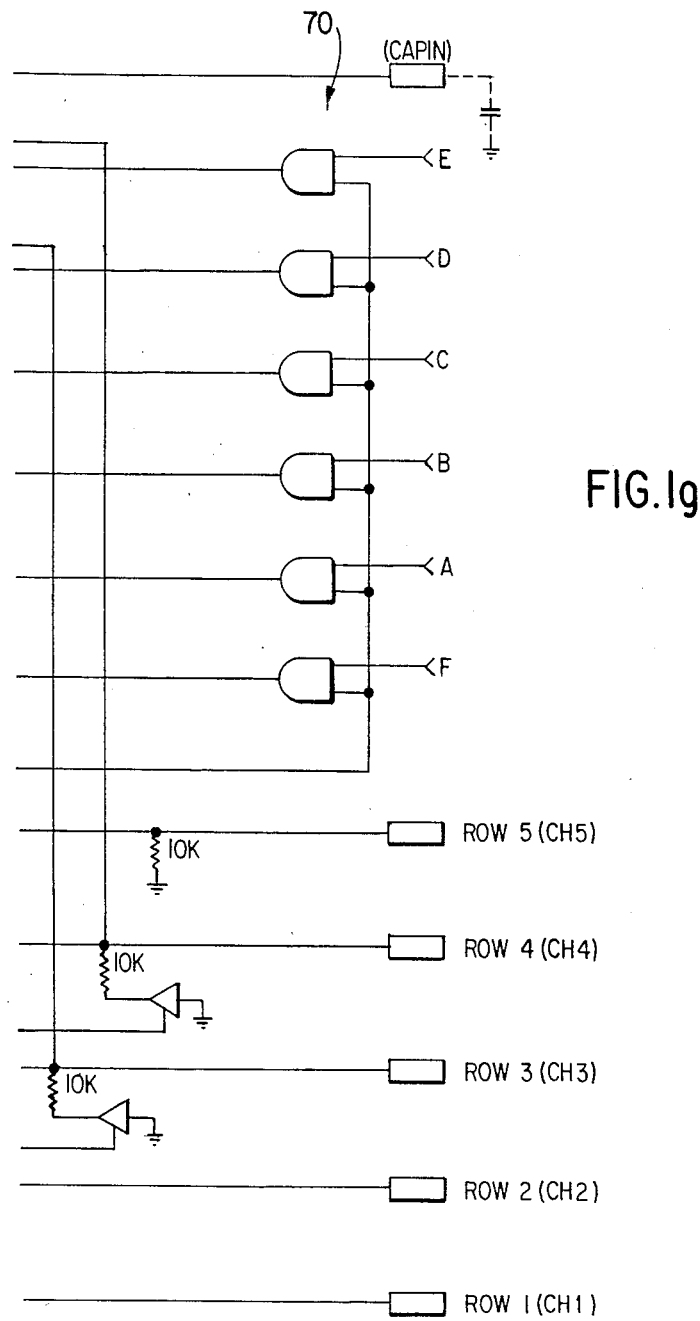
Figure 1H:
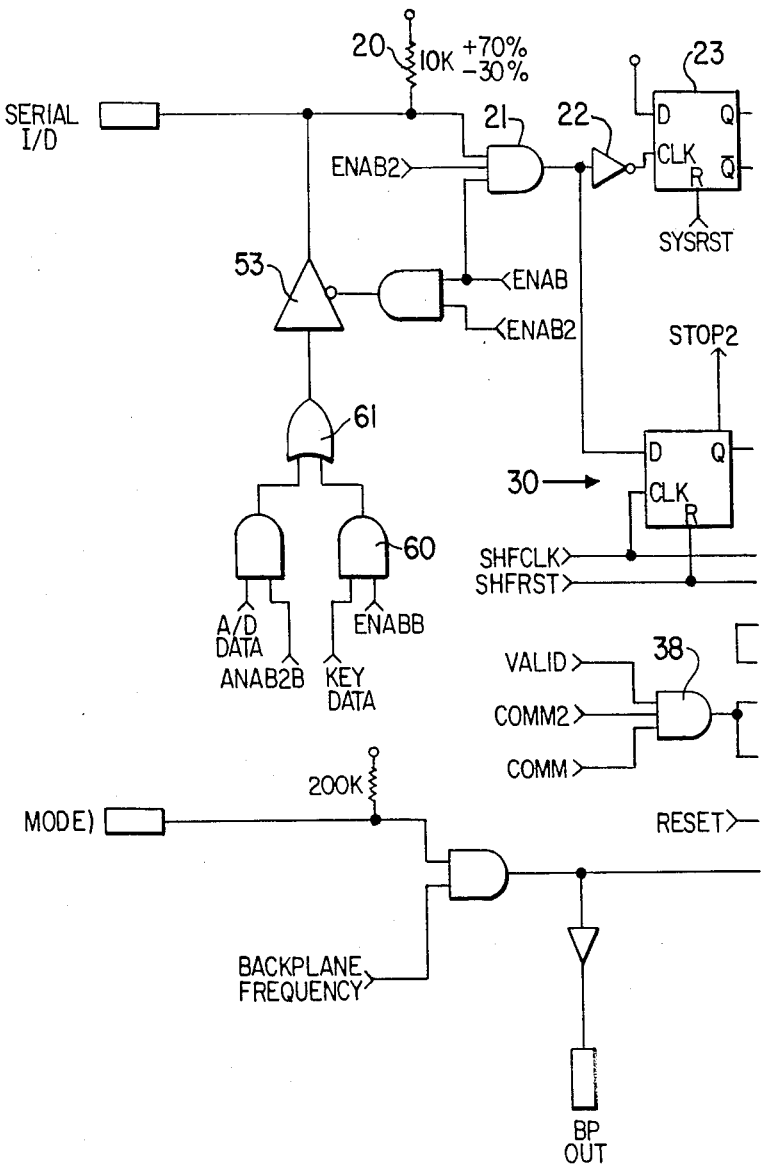
Figure 1I:
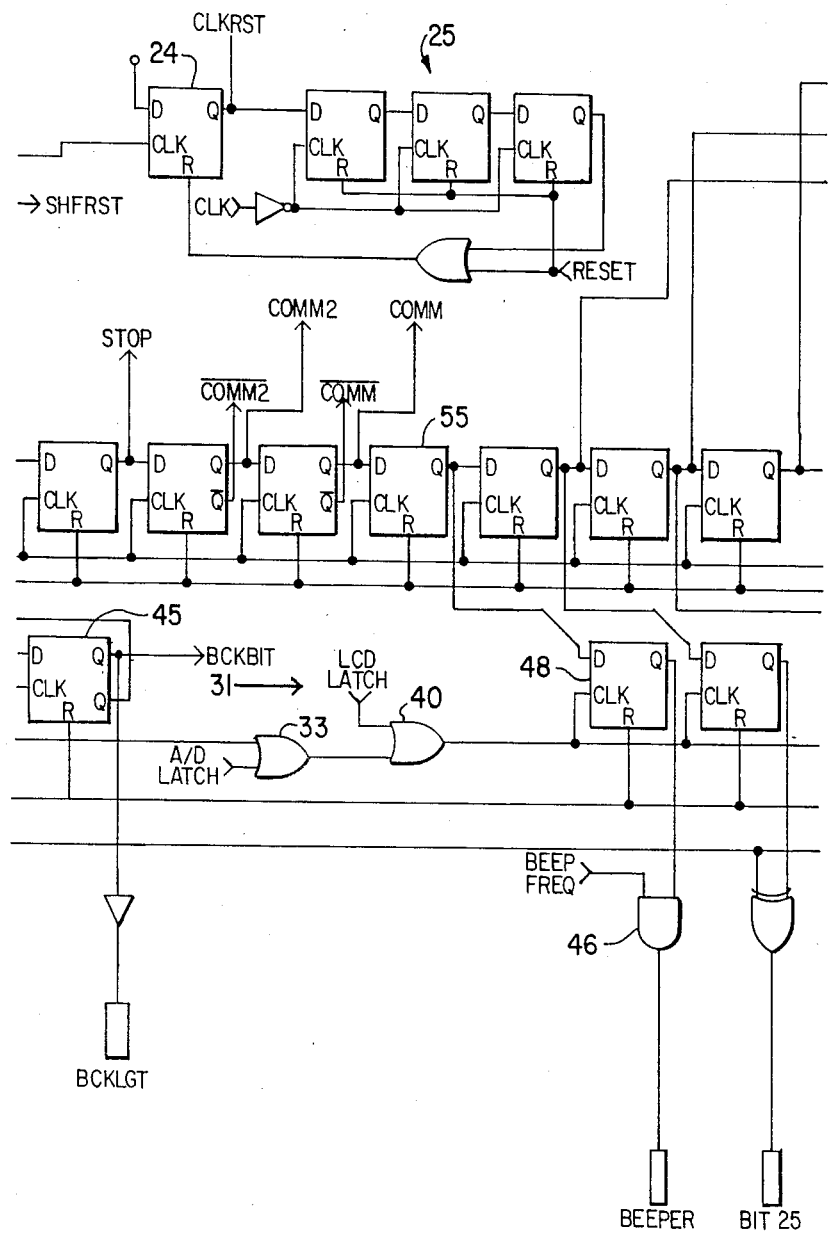
Figure 1J:
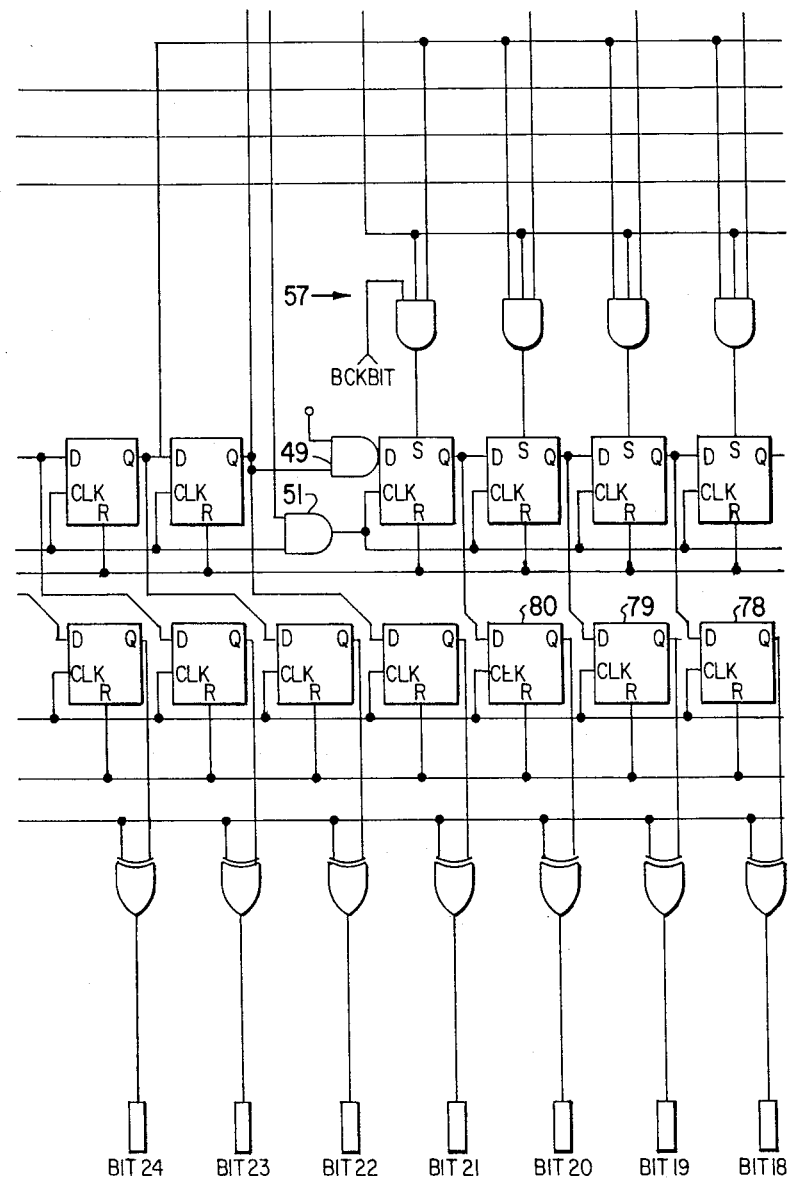
Figure 1K:
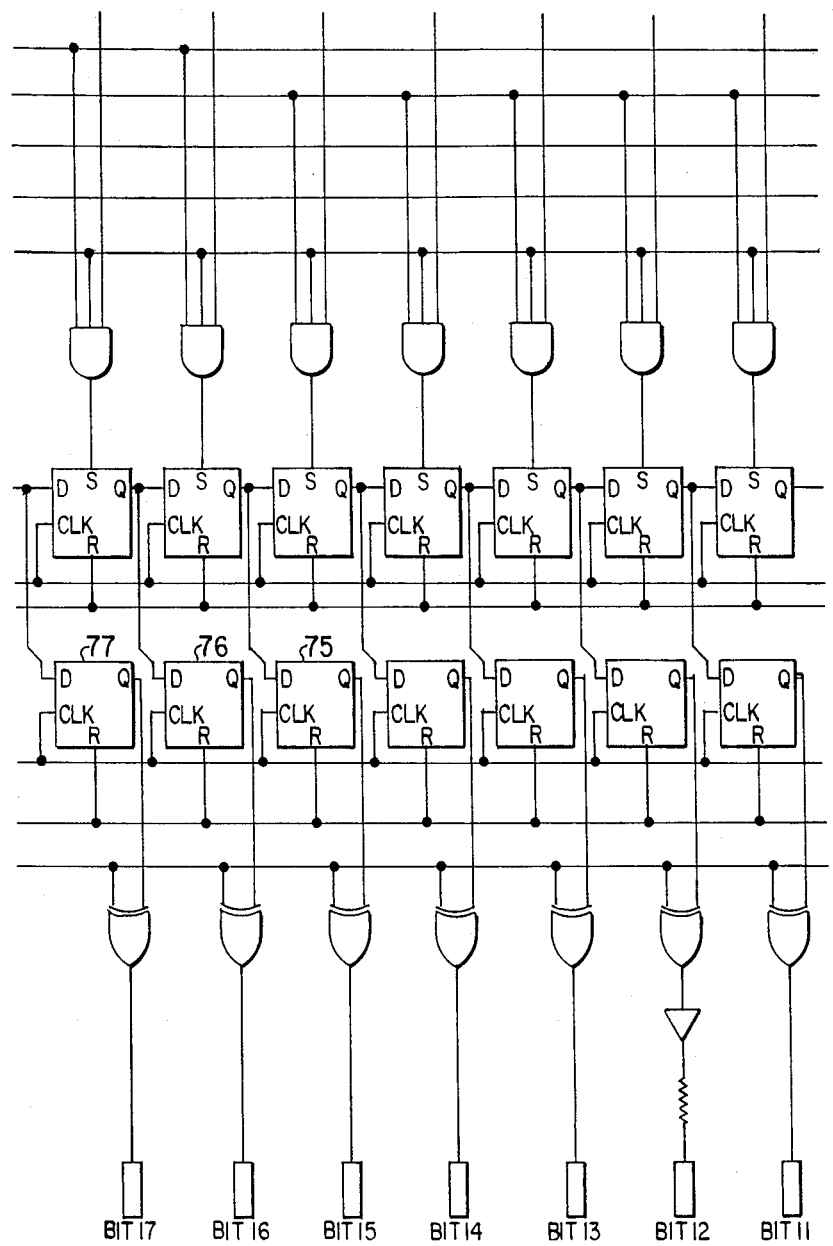
Figure 11:
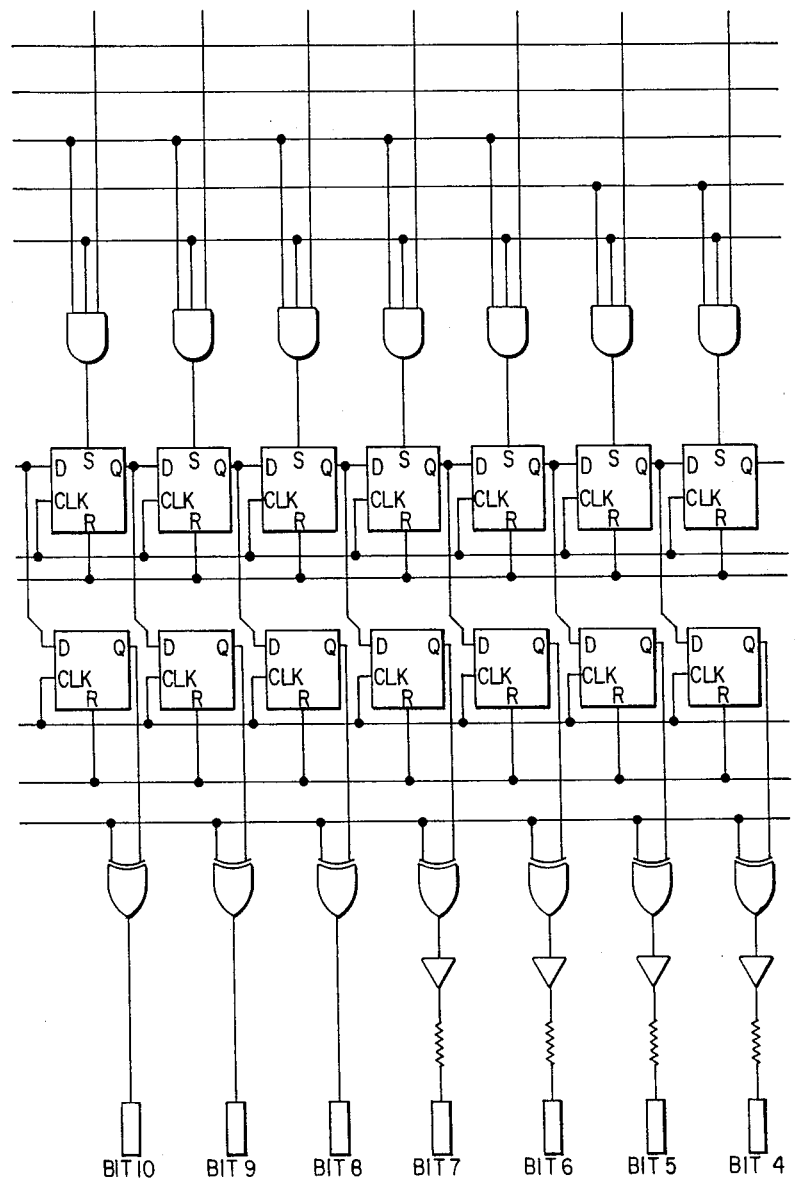
Figure 1M:
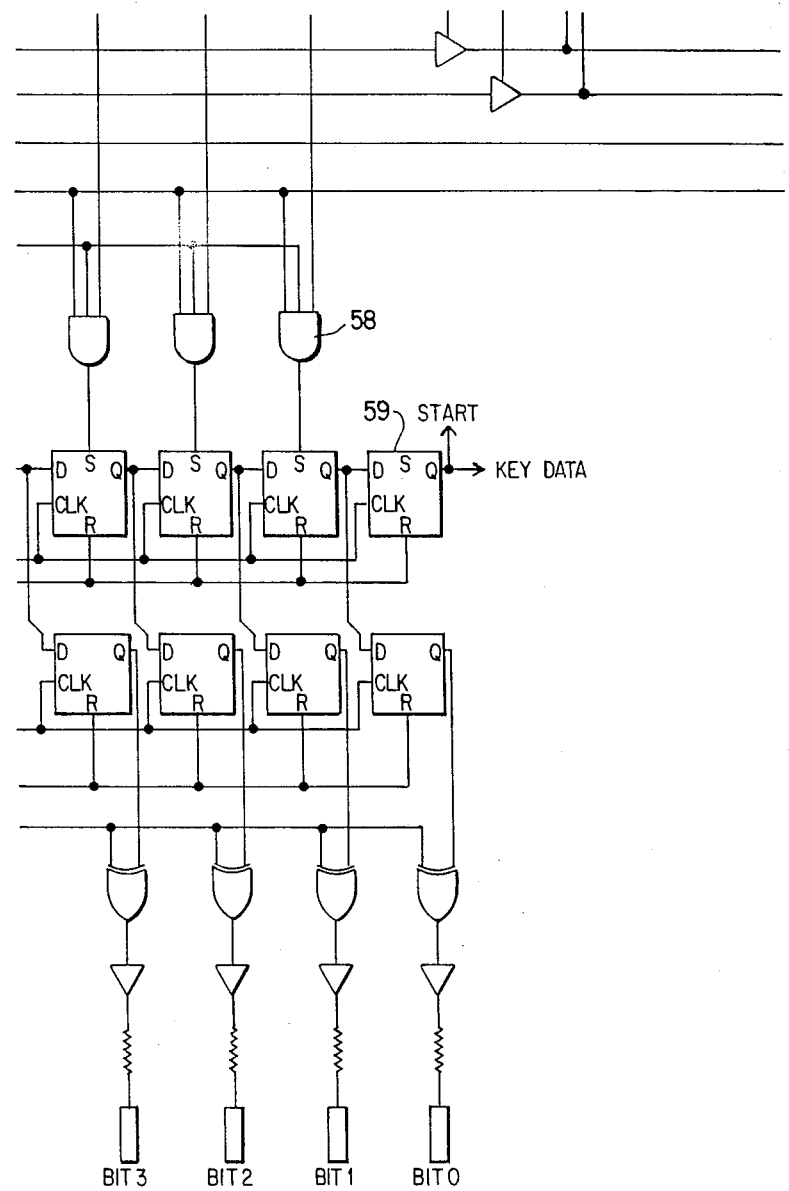
Figure 2:
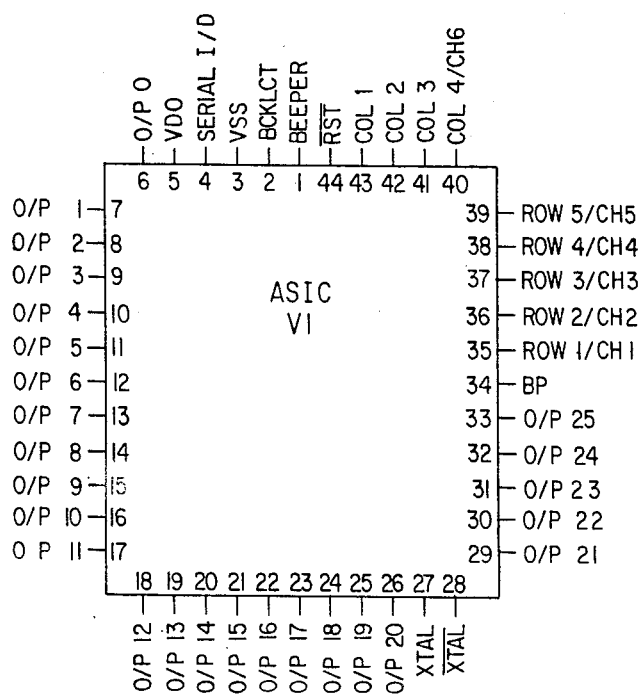
FIG. 2 shows the pin designations for one preferred embodiment of the novel ASIC (version 1)

To keep abreast of new technology and due to the pin count in version 1, a 44 pin J-Quad surface mount package is preferred. This is shown in FIG. 2.

Several of the outputs are given special drive capability as illustrated for BIT 0 to 7 and 12, outputs. The backlight control output BCKLGT for driving the liquid crystal display for the associated appliance can source 10 mA and maintain a 2 volt minimum. The acoustic beeper output BEEP for an audible transducer on the appliance provides a source of 7.0 V and can sink 30 mA while maintaining 1.2 V min. BITS 0-7 and 12 of the LCD segment drivers have 14 mA minimum and 25 mA maximum source capability. The outputs BITS 8 to 11 and 13 to 25 are standard CMOS buffered output.

Figure 3:
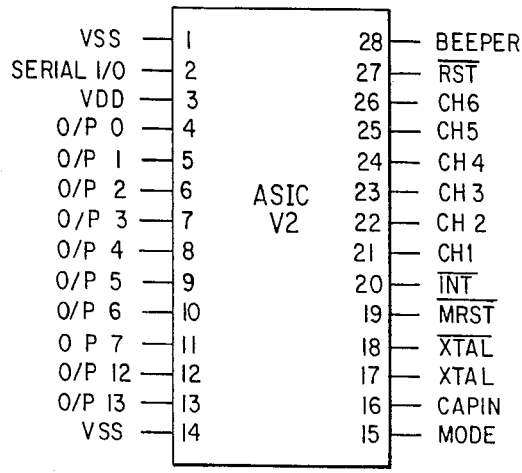
FIG. 3 shows the pin designations for a second preferred embodiment of the ASIC (version 2)

The two versions of the ASIC share the same "core" circuitry. They are, however, designed for different applications. Version 2 does not provide signals for an LCD or interface to a keyboard. The unused I/O pins can thus be eliminated. The result is a device which fits into a conventional 28 Pin DIL package, which is a more widely used package style and can realize a significant cost improvement over the 44 pin variety for this reason alone. The pin designations of the preferred form of version 2 are shown in FIG. 3.

The primary function of ASIC version 2 is to replace all of the circuitry which would otherwise have to be designed into the microprocessor and associated circuitry, i.e. that associated with the watchdog function, A/D conversion used for temperature (or other) sensing, AC signal conditioning to provide a 60 Hz interrupt and the high current drive for either direct coupling to sensitive gate triacs or the LED drive for opto-isolators used in the associated power equipment (motors, heaters, etc.).

Differences between the version will be outlined as they arise in the description of the general circuitry mode with reference to the circuit schematic of FIG. 1.

RESET CIRCUIT

Figure 4:
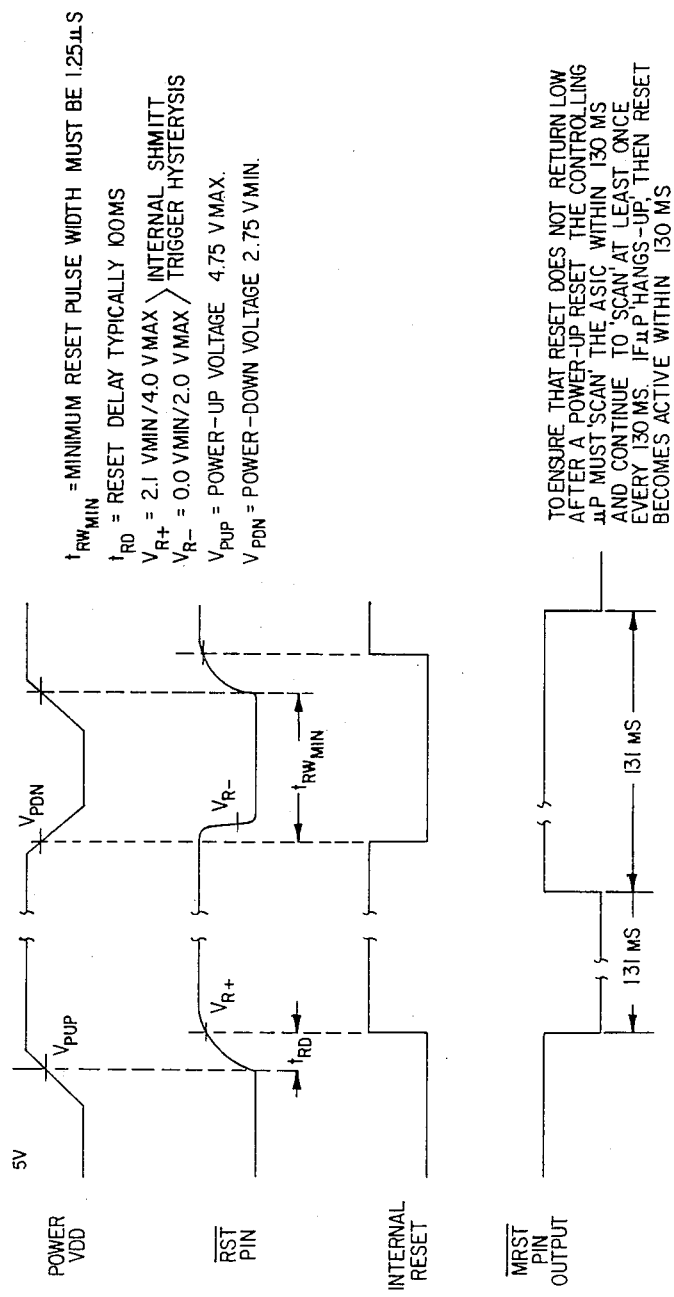
FIG. 4 shows graphs of reset timing waveforms for the device of FIG. 1.

A power-up reset or external reset to the device is activated via the $\overline{\text{RST}}$/TEST input. This is an active low input and does not require any external components, although it is pinned out for test purposes. The internal circuitry is configured in such a manner as to eliminate the need for input and comprises a hysteresis amplifier 1, and a power supply level sensor 2, feeding OR gate 3 to produce a RESET output. The parameters for the reset timing are shown in FIG. 4. Essentially, the reset timing has been chosen to meet the requirements of the reset input of the Motorola MC6805P2 mentioned before. The MRST output (to be described later) of the ASIC version 2 directly drives the MC 6805P2 reset input. This function is not provided on version 1.

The function of the $\overline{\text{RST}}$/TEST input terminal is of value during the IC manufacture to speed-up test procedures. The actual configuration of the RESET circuit can vary as it does not affect the operation of the device in any other manner. The RESET signal under normal operating conditions will only occur during POWER-UP. However, momentary contact to Vss of the $\overline{\text{RST}}$/TEST input will provide a device reset, proving the timing specifications apparent from FIG. 4 are met. The circuitry shown at 5 is also involved in speeding up testing during manufacture only, during use of the ASIC the periodic appearance of the SYRST signal causes it to serve only as a connector between the penultimate and the last flip-flop in the $\div 9$ counter chain.

OSCILLATOR CIRCUIT

An internal Oscillator circuit 10 is provided which is stabilised by a 4 MHz ceramic resonator 11 connected between XTAL and EXTAL inputs. Again, the specific circuitry of the oscillator can be varied but it should preferably be capable of driving the MC6805P2 from pin EXTAL to provide a 4 MHz clock for that unit. This type of design eliminates an additional resonator for the MC6805P2 and also ensures equivalent timing tolerances between the two devices. Overall synchronization is important during communications between the ASIC and the microprocessor.

INTERNAL TIMING

The output of the oscillator circuit is connected directly to the first stage 12 of a $\div 9$ Prescaler. The prescaler section consists of an asynchronous ripple counter with common resets. The function of the prescaler is to reduce the 4 MHz external frequency down to 7.813 KHz, which operates as the strobe (STR) signal for the system. Following the prescaler is another $\div 7$ asynchronous ripple counter which provides all of the main internal timing signals. Finally, there is an additional $\div 4$ asynchronous ripple counter, which reduces the frequency to approximately 3.5 Hz at the MRST output. The final stage of this counter receives a RESET input to its S terminal from OR gate 3 to give a MRST output except when microprocessor reset is required. The counter can be reset on a RESET or CLKRST pulse fed to OR gate 15.

Timing signals produced by this counting chain are:

| | |
|---|---|
| STROBE(STR) = | Approx. 7.813 KHz |
| SHIFT CLOCK(SHFCLK) = | Approx. 3.907 KHz |
| END OF MESSAGE(EOM) = | Approx. 61.063 Hz |
| BEEP FREQ = | Approx. 1.953 KHz |
| BACKPLANE FREQ = | Approx. 61.063 Hz |

Figure 5:
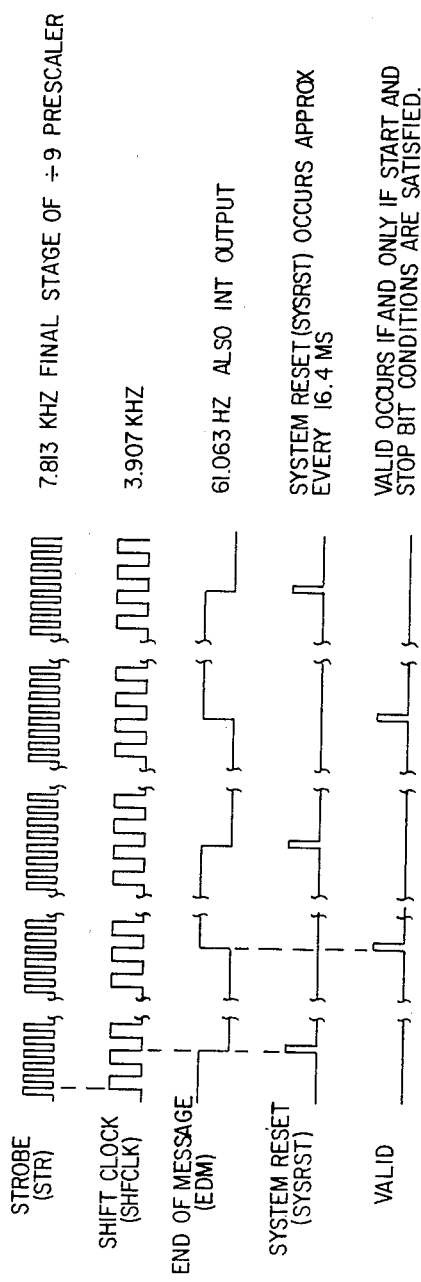
FIG. 5 shows details of system timing waveforms for the device of FIG. 1.

FIG. 5 illustrates the important first three mentioned above and a few additional signals which will be covered shortly.

DATA FORMAT

Before further explanation of the overall circuit operation, a short discussion of the communications data will be necessary.

The ASIC is essentially a "dumb" device. It has no inherent intelligence and, therefore, requires an interface to a controlling device, such as the Motorola MC 6805P2 8-bit microprocessor.

The ASIC is able to communicate with the controlling device via the asynchronous serial communication line connected to the bidirectional port SERIAL I/O of FIG. 1. This port is designed to sink in the range of 10 mA min, 20 mA max. at 2 V. During communications with the ASIC, the controller sends a 32 bit message in a specific format. The data format adopted and as illustrated in FIG. 6 does not adhere stringently to the current industry standards but has been developed specifically for use in communications with the ASIC by the assignee of this invention.

Figure 6:
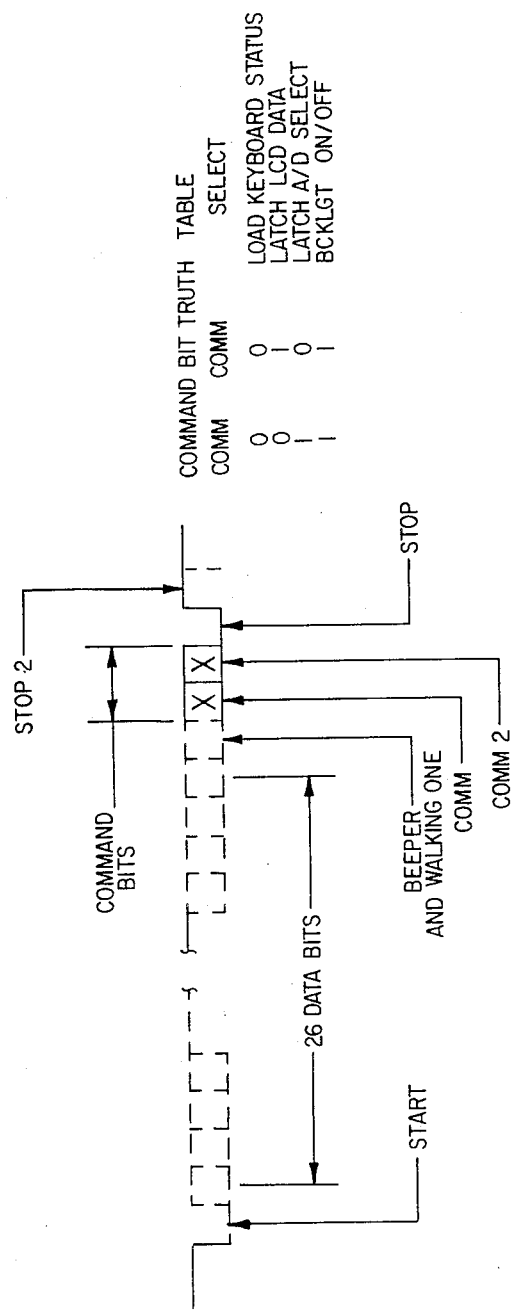
FIG. 6 shows an analysis of the data format for use with the device of FIG. 1, with command bit truth table.

As indicated in FIG. 6, the data string comprises a START bit, 26 INFORMATION bits, BEEPER control bit, 2 COMMAND bits and finally 2 STOP bits. The 26 information bits will vary depending on which command has been selected and which version of the ASIC is being used. Both ASIC versions use two command bits which gives four possible command words. FIG. 6 also shows a truth table outlining the possible options. To facilitate better understanding of the circuit operation, the explanation will now be directed to ASIC V.1.

RESET CIRCUIT OPERATION AND WATCHDOG

Figure 7:
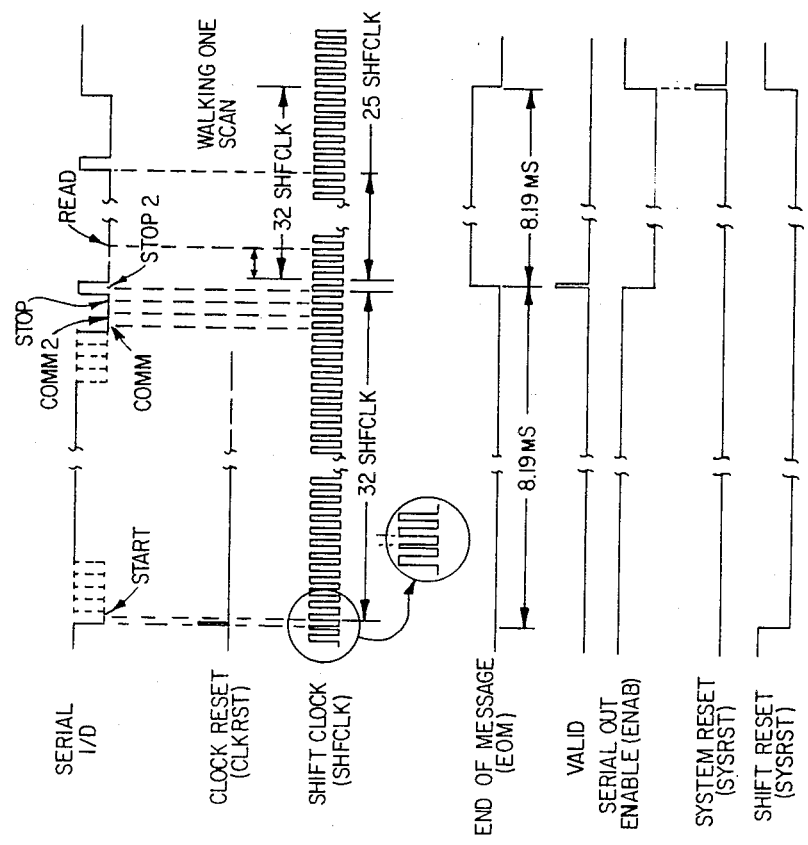
FIG. 7 illustrates typical send and receive and associated timing waveforms for the device of FIG. 1.

Let us assume that a power-up reset has occurred and the entire device set in a reset condition. If no communication takes place between the ASIC and the controlling device, then an internally generated system reset (SYSRST) developed at OR gate 16 from flip-flop 17 fed from the output of the −7 counter, occurs every 16.4 mS. The SYSRST signal does not, however, provide a 100% system reset, and certain key functions of the circuit can only be reset by a RESET signal. Further if, after approximately 135 mS, the microprocessor controlling device does not "talk" (send proper expected data) to the ASIC, then the ASIC assumes that the micro controller is temporarily inoperative. To correct this situation, the ASIC as "watchdog" switches the MRST output to the controller to a logic ONE to re-establish communications by resetting the microcomputer. To maintain proper circuit operation, the controlling device must communicate properly with or "scan" the ASIC at least once every 135 mS. A typical send/receive pattern between controller and ASIC is shown in FIG. 7.

DATA STREAM DETECT CIRCUIT

After a power-up reset, the serial I/O line is at a logic "1" level. This is by virtue of the 10K internal pull-up resistor 20 and the fact that the I/O port pin of the controller is programmed as an output at a high level during initialization. In order to initiate a data transfer, the controller must first pull the SERIAL I/O pin low (logic "0"). This negative edge propagates through the three input AND gate 21 and is inverted at 22, thus providing a positive transition to the clock input of the Shift Register Reset Control flip-flop 23. The triggering of this D Type flip-flop releases the resets of the 32 bit shift register 30 via SHFRST on the Q output.

In addition, the Q output of flip-flop 23 provides a trigger for the clock reset control flip-flop 24. The Q output of this D Type flip-flop provides the signal CLKRST through OR gate 15 to the entire clock timing counter chain except the final stage. This results in reset of the counter chain. The broken out section of the shift clock waveform SHFCLK (the clocking waveform for register 30, obtained from the timing chain) of FIG. 7 demonstrates the clock circuit reset action. The width of the CLKRST signal should be sufficient to guarantee a reset condition on the timing chain flip-flops. This CLKRST pulse width is obtained by feeding the output of flip-flop 24 through the three stage shift register 25 and then to the reset of flip-flop 24.

Approximately 128 uS after the removal of CLKRST, the SHFCLK signal triggers the input stage of the 32 bit shift register 30. The incoming data bits from the controlling microprocessor device each have a width of approximately 256 $\mu$S. This value is fairly accurate because the MC6805P2 has an internal timer. The objective is to have the rising edge of the 3.907 KHz SHFCLK signal sample the incoming data at the midpoint of each data bit. The serial data string is thus clocked into the 32 bit shift register 30 in the previously specified data format. If the serial data string does not meet the exact specifications of the format, it will not be properly received in register 30 and thus cannot be subsequently latched into the respective output latches of latch group 31.

Assuming the start and stop bit meet the proper logic levels, a logic "1" will be present on the D input of the VALID control signal flip-flop 35. One-half SHFCLK cycle after the 32nd "serial" bit is shifted into register 30, the End of Message (EOM) signal becomes available. The 128 $\mu$S delay from the end of the data string to the start of the EOM allows the system adequate time to settle before the data is latched. The rising edge of the EOM clocks the VALID control flip-flop 35 and the logic "1" is transmitted through the flip-flop and becomes the VALID signal. Depending on which function has been selected via the command bits, the VALID pulse will propagate through one of the four possible "glue logic" command circuits 36, 37, 38 or 39. The width of VALID pulse is one-quarter of SHFCLK (approximately 64 $\mu$S). It is the rising edge of this pulse which triggers the selected function to be peformed by the ASIC. For the LCD LATCH the signal triggers the 27 bit output latch group 31 through OR gate 40 and the contents of the register 30 are transferred to the respective latches. If the command function chosen has been either LCD LATCH or BCKLGT ON/OFF there is no return information. The remaining command functions A/D LATCH and LOAD KEYBOARD STATUS would have information to be returned to the controlling device. Explanation of these two functions will be saved for another section.

When there is no return of information to the controller there follows a "dead time" of approximately 8.2 mS. No further data transmission can take place until after the end of the dead time. If transmission is attempted by the controller, the data will be lost. Approximately 16.3 mS after the "initial low" signal from the controller, a SYSRST signal is generated by circuits 17 and 16. The SYSRST pulse is approximately 64 $\mu$S wide, and clears the Shift Register Control flip-flop 23 and thus the 32 bit shift register 30. Only after this flip-flop has been reset will the ASIC be ready to receive a new data string. It is important that the ASIC not be writted to at a rate faster than once every 16.4 mS.

The flip-flop 17 which provides the SYSRST pulse also supplies the INT output signal which is connected directly to pin 2 (INT input) of the MC6805P2 microcomputer. This is an approximate 60 Hz interrupt to the controlling device for use as a real time clock. The INT signal from the ASIC occurs approximately every 16.4 mS and should always be provided, and is particularly important if the microprocessor has its own independent clock and is not driven directly by the ASIC oscillator 10, as described above. Communication between the controlling device and the ASIC should thus be synchronized to the INT signal. All send/receive information can be performed well within the 16.4 mS window.

Although FIG. 2 implies that the LATCH A/D function is not available on the ASIC V.1. This fact is not entirely true. As indicated earlier, both versions of the ASIC have the same circuitry. They are simply packaged differently. If all of the keyboard inputs are not used for a keyboard function, the remaining inputs may be used as analog inputs. This illustrates an aspect of the great versatility designed into the device.

BACKLIGHT

ASIC V.1 is intended primarily as an LCD driver. Current Liquid Crystal displays being designed into the applicant's control systems are of the transmissive type. These displays require some form of backlighting in the viewing area for the segments to be visible. To control the backlighting, the ASIC has an output (BCKLGT) which is capable of driving the base of a darlington transistor. The BCKLGT function has a command word (shown here as logic "1" for both COMM and COMM2) and is effected through AND 38 and flip-flop 45 in the same manner as already described for the LCD latch. An added feature is that the state of the BCKLGT control (on/off) can be read back by the controller during a keyboard scan. If the BCKLGT control flip-flop 45 is inadvertently triggered by noise, the controlling microprocessor can detect the fault during a normal keyboard scan and rectify the condition. The activation or deactivation of the BCKLGT control normally occurs during a change in the LCD condition. For this reason, the clock edge to the BCKLGT control flip-flop 45 also clocks the 27-output latch group 31 through OR gates 33 and 40. Two related functions may thus be accessed simultaneously. The BCKLGT output is not provided in the ASIC V.2.

BEEPER

The BEEPER output is available through AND gate 46 from latch 48 and is essentially an approximate 2 KHz gated signal used to activate a piezo acoustic annunciator. The beeper control bit is bit 27 in the data string. Typically, the beeper activation time is approximately 200 mSec. The duration time is not fixed but must be a multiple of the 16.4 mSec scan rate.

KEYBOARD READ

During a keyboard scan, the controlling microprocessor initiates data transfer and sends the 32 bit string. The point of significance here is the position of the "walking ONE" within the data string. Bit 27 of the data string provides the walking one. The START, STOP and COMMAND bits must meet the proper format also. All other bits within the string are cleared to zero to ensure that a false key bit is not received by the controller. Upon receiving the data string and decoding the command bits COMM=0, COMM2=0 the ASIC glue logic disables the SHFCLK signal from the final twenty-two stages 49 fot he shift register through AND 37, flip-flop 50 and AND 51. The ENAB signal from flip-flop 52 also goes low thus disabling the serial input circuitry at AND 21 and enabling the serial output (DATA OUT) tri-state gate amplifier 53.

The first 10 stages of the shift register 30 still have the SHFCLK signal present. On each successive SHFCLK signal the walking ONE beginning at flip-flop 55 is shifted one position to the right. This provides successively a logic "1" at the column (Col 1-4) outputs in turn. If a key were pressed, the corresponding row input would then become high since key processing will bridge a COL and a ROW contact unique to that key. The combination of the COL output, ROW input and LOAD signal (from AND 56) is then unique to one member of the AND gate group 57 and will preset the corresponding flip-flop within the shift register section 49. For example, if Key 1 of the keypad were pressed during a key scan, then COL1, ROW1 would become active and the flip-flop 58 would be preset one half SHFCLK later by the STR signal. Typically, only one flip-flop will be preset during a keyscan, but if more than a single key is pressed, more than one flip-flop in register 49 will be activated. Only 3 SHFCLK edges are required to fully scan the entire 20 key matrix. On the fourth SHFCLK edge following an EOM signal into flip-flop 35. the flip-flop 50 which has been disabling the SHFCLK signal through AND 51 to the shift register section 49 is reset. This allows the ASIC to begin shifting the data out to the controlling microprocessor. (After the microprocessor has sent the initial data string, it has turned its serial line around to become an input). At this point, the serial I/O line is held low by the START bit in the final stage 59 of the shift register 49, by way of AND 60, OR 61 and gate 53.

The microprocessor controlling device begins to scan the serial I/O line approximately 900 μSec after it has made a keyboard scan request. The first bit received by the microprocessor is the START bit followed by 20 bit corresponding to the keyboard read, the state of the back light control bits (BCKBIT) and two stop bits. The condition of the STOP bits sent by the ASIC is reverse to that sent by the microprocessor since the first STOP bit is now the walking ONE which has been stepped through the register and the second stop bit is the ZERO from the COMM bit in the LOAD KEYBOARD command.

To determine which key has been pressed, the controlling microprocessor simply requires an internal counter to determine the position of the "1" generated by the key press.

Although a keyscan takes more time than the normal data send, it still does not require the full 16.4 mSec data window. After completion of the keyscan, the ASIC generates a SYSRST at flip-flop 17 through OR 16, setting itself up for the next communication sequence. Due to the length of time required by the SEND-/RECEIVE sequence, it is imperative that the communication be synchronized to the 60 Hz INT output. In this way, the microprocessor timing (if using an oscillator not tied to oscillator circuit 10) is not disturbed substantially.

It is intended that keypad monitoring be done at a fairly brisk pace. At least once every 60 to 100 mSec. From this it can be seen that at least 10 to 15% of the microprocessor execution time is devoted to taking care of the keypad.

A/D CONVERSION

One of the unique aspects of the ASIC is its ability to perform a rudimentary form of Analog to Digital conversion. The A/D converter works on the principle of an RC network formed by an external capacitor at the terminal (CAPIN) and an external resistor at the respective (CH1-6) input. For temperature measurement, the external resistance used is typically a thermistor with a negative temperature coefficient.

Essentially, the A/D circuitry uses the varying resistance to provide an analog value (voltage) for digital conversion. The negative input comparator 65 is connected to the RC node 66. When activated, the output of the comparator produces an output pulse after a time determined by the values of the RC network then effective at node 66, the time varying in accordance with the resistance. There are six analog input channels, one of which must be a calibration input. The resistive devices used typically provide 5K-50K resistance swings.

The A/D function is principally intended for the ASIC V.2. It is however available on version 1 if at least 2 inputs are free, and all of the LCD drivers are not used.

The normal sequence of events taking place for an A/D request is as follows. The channel is selected by activating one of the A-F select lines. Due to the fact that the output latches 31 are being used, it is important typically that the Bits 0-2 outputs remain unchanged since these are used for componens such as fans, motors, valves, etc. which should not be interrupted. After the microprocessor has completed the 32 bit "SEND" string including the A/D select command word, it reverses its I/O pin and begins an internal counter to determine the length of the returning pulse. The command word is decoded by the ASIC and disables the analog gate 67, shorting the CAPIN input to ground. The ENAB2 signal at flip-flop 63 activates the AND gate channel selector group 69. The ENAB2 signal activates the AND group 70 so that the respective ANALOG channel switches 71 can be activated. Due to the nature of the circuit, it is important that the "ON" resistance of the analog switches 71 not excees approximately 250 ohms. When a channel has been activated by switching input at a selected terminal A to F obtained from a respective flip-flop 75 to 80 in the latch group 31 containing the data bit for that channel, the voltage at the negative input of the comparator 65 begins to rise by virtue of the external capacitance being charged towards VDD by the respective external resistance connected to VDD.

When the voltage at the negative input reaches ⅔ of VDD the output of the comparator 65 switches. The controlling microprocessor sees the falling edge and stops its internal counter to determine the equivalent digital value. After the A/D sequence is complete, the ASIC generates a SYSRST, thus resetting the device for the next sequence.

Figure 8:
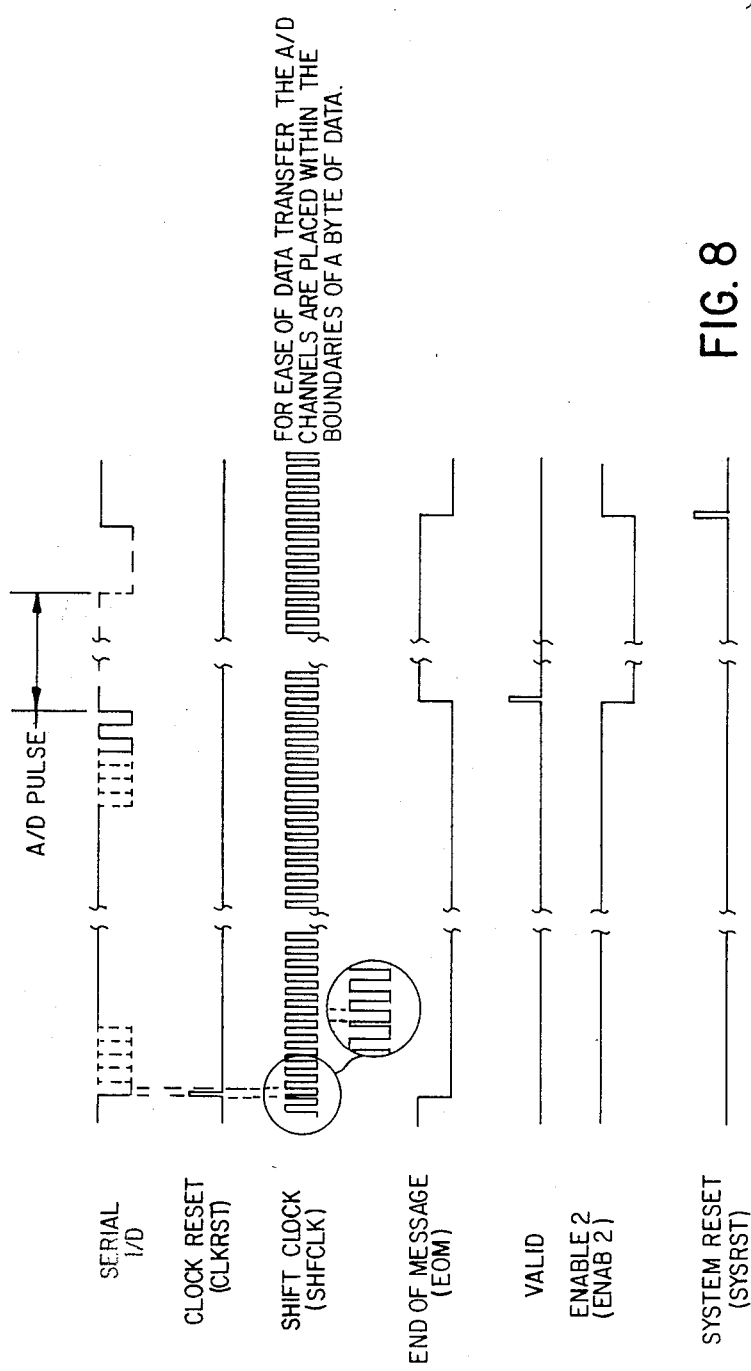
FIG. 8 is a typical analog/digital read provided by the circuitry of FIG. 1 and associated functional waveforms under these conditions.

The width of the output pulse generated by the comparator is typically 500 μS to 6 mSec. For ease of data transfer the A/D channels are placed within the boundaries of a byte of data. FIG. 8 illustrates a typical A/D read.

The embodiments of the invention in which an exclusive property or privilege is claimed are defined as follows:

1. A circuit for cooperation with serial data sending and receiving means which comprises:
   a terminal for data path connection with said means;
   register means for serially receiving data from, and for serially feeding data therein to, said terminal;
   means for storing data received in said register means;
   means for feeding data into said register means for subsequent feeding to said terminal;
   timing oscillator means for generating a shift clock signal for said register means for stepping the register means synchronously with said serially received data from said terminal and for stepping said register means at a predetermined rate when serially feeding data therein to said terminal;
   validating means detecting presence of start and stop bit data in predetermined locations in said register means defining a data phrase received at said terminal;
   means detecting command bit data in said data phrase;
   means responsive to simultaneous output of said validating means and to output of said command bit data detecting means for switching said means for storing data and said register means in accordance with said command bit data.

2. In a system comprising a pair of data handling stations linked by a data transmission path and comprising interrogation and data receiving means at one of said stations, means at the other station comprising:
   register means for serially receiving data from and for serially transmitting data in said register means to, said first station;
   means for storing data received in said register means;
   means for feeding data into said register means for subsequent transmission;
   timing oscillator means for providing timing functions for said second station means and for synchronizing data flow from, and data reception capability at, said first station means;
   said timing means generating a shift clock signal for said register means for stepping said register means synchronously with serially received data from said first station and for stepping said register means synchronously with the data reception capability at said first station;
   validating means detecting presence of start and stop bit data in predetermined locations in said register means defining a data phrase received from said first station;
   means detecting command bit data in said received phrase; and
   means responsive to simultaneous output of said validating means and to output of said command bit data detecting means for switching said means for storing data and said means for feeding data in accordance with said command bit data.

3. In a system defined in claim 2, input means at said second station for said data feeding means, said simultaneous responsive means actuating said feeding means and said input means.

4. In a system as defined in claim 2, further means at said second station responsive to said simultaneous responsive means for switching data path terminal means at said second station to provide an output terminal for data from said register means.

5. In a system defined in claim 2, said first station providing a data bit in said phrase for sequencing through a part of said register means by said shift clock signal, said bit thereby respectively interrogating individual inputs from said second station input means for feeding into respective stages of said register means.

6. In a system comprising a pair of data handling stations linked by a data transmission path and comprising interrogation and data receiving means at a first of said stations, means at the second of said stations comprising:
   register means for receiving serial data from said first station;
   latch means for storing data received in said register means;
   timing oscillator means for providing timing functions for said second station means and for synchronizing data flow from and data reception capability at, said first station;
   said timing means generating a shift clock signal for said register means for stepping said register means synchronously with a data bit stream received from said first station;
   validating means detecting presence of start and stop bit data defining said stream in predetermined locations in said register means;
   means detecting command bit data in said stream;
   means responsive to the output of said validating means and to detected command bit data for switching said latch means for storing data received in said register means; and
   output means responsive to said latch means for driving output devices at said second station.

7. In a system defined in claim 6, input means at said second station for loading said register means independently of input from said first station, and further means at said second station responsive to said validating means and detected command bit data received in said register means from said first station for actuating said register means to receive input from said second station input means.

8. In a system as defined in claim 6, second further means at said second station responsive to said validating means and detected command bit data in said data register means from said first station for condtioning said second station for transmitting data placed in said register means by said second station input means through said data path to said first station.

9. In a system defined in claim 6, said first station providing a data bit in said serial data for sequencing through a part of said register means by said shift clock signal, said bit thereby respectively interrogating individual inputs from said second station input means for loading into respective stages of said register means.

10. In a system defined in claim 6, selected latch means storing respective data bits received in said register means from said serial data for controlling respective analog switches at said second station; and
   individual sensor means connected to said respective analog switches for producing a timing pulse of duration corresponding to a value measured by the respective sensor, and means responsive to said validating means and detected command bit data for feeding said timing pulse as output to the first station.

11. In a system defined in claim 2, means sensitive to a voltage level in said data path and responsive to a shift in said level following a period at said level without change, comprising:
   bi-stable means first switched by said level shift and further switched by change back to said first mentioned level;
   second bi-stable means responsive to the first switching of the first mentioned bi-stable means; and
   delay means preventing reset of said second bi-stable during a predetermined period for all subsequent switching of said first bi-stable, switching of said second bi-stable generating a clock reset pulse for synchronizing timing functions provided by said timing oscillator means.

12. A circuit which comprises,
   a shift register,
   mode control means for said circuit for conditioning said shift register to a plurality of operating states,
   local data generating means,
   a terminal for receipt and transmission of serial data fed thereto,
   storage means for subsequent utilization of data received by said shift register from said terminal,
   said mode control means alternatively conditioning said shift register for receiving serial data from said terminal and for conditioning said shift register for receiving local data from said local data generating means,
   said mode control means also conditioning said shift register for feeding said local data therein serially to said terminal,
   and means responsive to chosen received serial data at said terminal for actuating said mode control means.

13. A circuit as defined in claim 12, serial data received from said terminal including a specific data bit, shift clock means for sequentially moving said data bit for actuating gate means for said local data generating means for sequentially feeding local generated data into respective chosen stages of said shift register.

14. A circuit as defined in claim 12, said local data generating means comprising charge responsive means for generating a pulse of duration dependent upon time from a chosen start point to a second time point when said charge reaches a chosen value, said mode control means being actuable to connect output of said charge responsive means to said terminal.

* * * * *

UNITED STATES PATENT AND TRADEMARK OFFICE
CERTIFICATE OF CORRECTION

PATENT NO. : 4,816,823
DATED : March 28, 1989
INVENTOR(S) : John Polkinghorne, et al.

It is certified that error appears in the above—identified patent and that said Letters Patent is hereby corrected as shown below:

Column 1, line 68 reading "timing oscillation" should read -- timing oscillator --.

Signed and Sealed this

Twenty-first Day of November, 1989

Attest:

JEFFREY M. SAMUELS

*Attesting Officer*       *Acting Commissioner of Patents and Trademarks*